Sept. 13, 1932.        B. E. HORNE        1,876,937
PRESSURE REDUCING VALVE
Filed Jan. 22, 1929
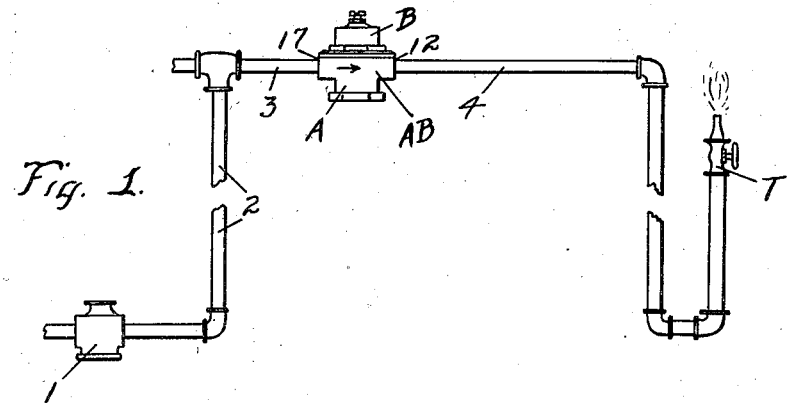
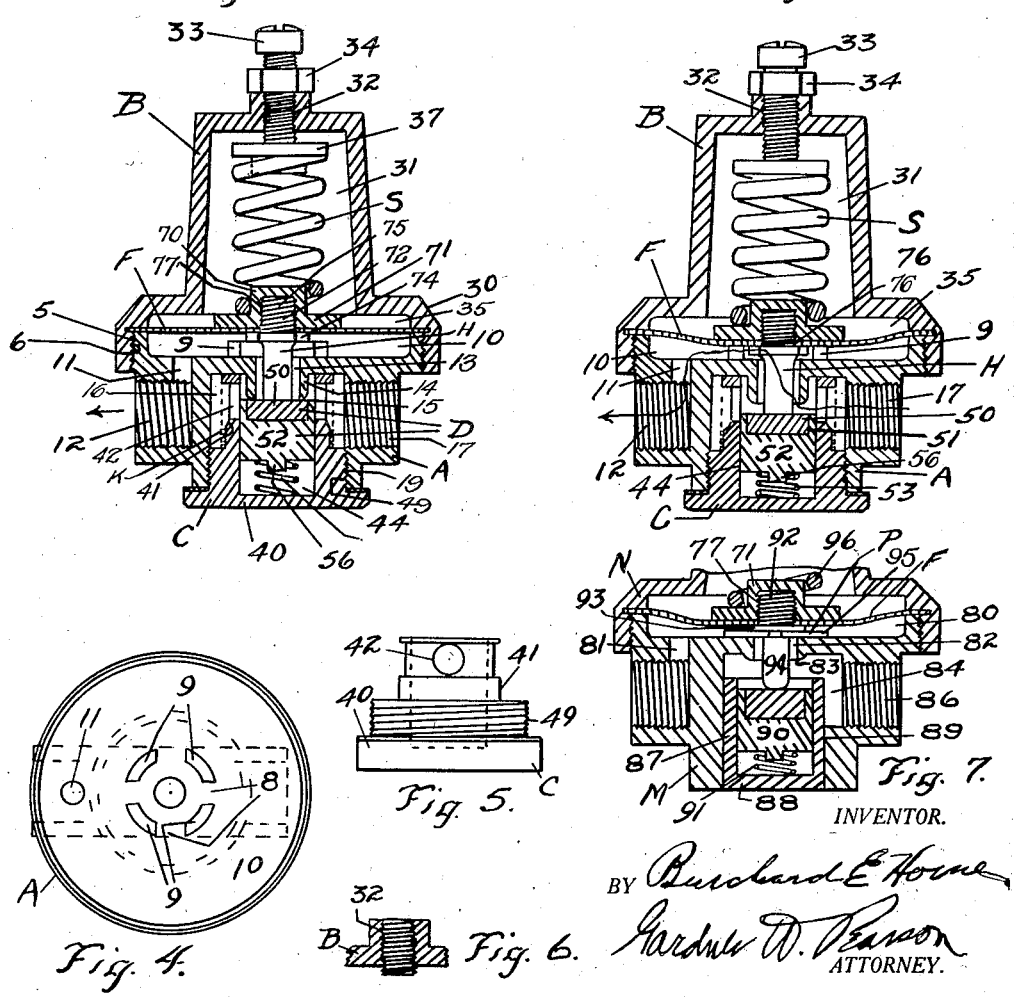
INVENTOR.
BY Burchard E. Horne
Gardner W. Pearson
ATTORNEY.

Patented Sept. 13, 1932

1,876,937

UNITED STATES PATENT OFFICE

BURCHARD E. HORNE, OF ANDOVER, MASSACHUSETTS

PRESSURE REDUCING VALVE

Application filed January 22, 1929. Serial No. 334,259.

This invention relates to pressure reducing valves for use in reducing pressure of liquids and fluids for various purposes.

It may be used in the water supply system of cities and towns to reduce the water pressure for drinking fountains, for reducing air or water pressure for pneumatic tools, for reducing the water pressure in gas refrigerators where it is necessary to reduce the water pressure to their condensing coils, to reduce steam or gas pressure, and in many other places.

It is so constructed that the pressure of the fluid has a tendency to close the valve but the closing pressure can be regulated by a suitable adjusting screw.

It can readily be taken apart for replacements, and there is very little to get out of order.

My valve can be used for reducing the pressure of any fluid which is flowing through a passage whether the fluid is a liquid, steam, or a gas, and will automatically adjust itself so that it will not chatter nor allow increases nor decreases in the pressure of the fluid, after it has passed through the valve.

I believe I am the first to use a valve disc stem fixed to the diaphragm instead of to the disc or to the disc holder.

With my construction of the valve disc wherein an imperforate disc of suitable material such as fiber is forced into a cup in a metal holder, there is much less chance of liquid working in around the rim of the disc, thence underneath and up through a screw hole than where the stem and disc are fastened together by passing the stem into and through the disc.

By using this kind of a cup, my valve disc slides in its tubular guide like a piston in a cylinder.

One of the great difficulties in pressure reducing valves is leakage at various points and the great advantage of my construction is that the fluid cannot easily work around or through the valve disc of the diaphragm whereby the adjusted pressure might vary.

In the drawing, Fig. 1 is a diagrammatic elevation showing one of my valves inserted in a water pipe line leading to a fountain.

Fig. 2 is a vertical section showing my valve with the disc seated.

Fig. 3 is a vertical sectional elevation showing the valve disc off its seat.

Fig. 4 is a plan view from the top of the valve body with the cage and diaphragm removed.

Fig. 5 is an elevation of my preferred form of disc guide forming part of a plug.

Fig. 6 is a fragmentary section showing top of a sealed valve.

Fig. 7 is a vertical section showing part of a modified form of valve.

In the drawing, 1 represents a water meter in a pressure water supply system by which water is supplied to pipe 2 and the pipe 3 enters my reducing valve AB. The pipe 4 connects with the outlet of valve AB and extends to a drinking fountain T.

A represents the body of my valve at the top of which is a circular chamber 10 which I will call the lower diaphragm chamber as it is over this that the diaphragm F is positioned. From this diaphragm chamber extends a passage 11 to the main water outlet 12. Both comprise the diaphragm outlet.

Extending centrally downward out of chamber 10 is a chamber inlet 13 inside of a hub 14 which terminates at the bottom in a valve seat 15 for the valve disc D.

This hub extends down into a valve chamber 16 into which extends main fluid inlet 17 which connects with pipe 3 shown in Fig. 1. Seat 15 as shown is concentric with chamber 16 but chamber 16 need not be cylindrical.

C represents a plug shown as closing the bottom end of chamber 16 and as having a head 40. Plug C is threaded at 49 to engage threads 19 on the inside of valve chamber 16.

This plug C has a reduced portion 41 which extends right up around hub 14 to the top of the valve chamber and has passages 42, 42 from its outer to its inner wall, which inner wall is part of a dead ended valve disc guide 44.

As shown, I use a cylindrical strainer K in position on the reduced portion or neck 41 of plug C.

D is a valve disc and includes an imperforate disc of suitable material such as fiber 50 firmly seated in a cylindrical recess 51 in a metal plunger or cup 52 which has a stud 56 at the bottom for spring 53 and fits with a smooth running fit in guide 44.

Cage B is shown as being flanged to form a bonnet at 30, and as extending down outside of the annular top of body A forming upper diaphragm chamber 35, the parts being connected together by threads indicated by 5 and 6. The diaphragm F is held at its rim between the cage B and body A in the middle of a diaphragm chamber formed by 10 and 35.

Cage B has the spring housing chamber 31 which extends upward, and at the top of this is a threaded adjusting screw opening 32 through which the adjusting screw 33 passes. 34 is a lock nut to lock the adjusting screw in position, and 37 is a spring washer having a boss which is surrounded by one end of the main compression pressure spring S, the other end of which surrounds a boss 70 on the pressure plate 71, into which passes the stem 72, all forming part of the valve opening member H. Fixed to stem 72 is a hexagonal collar 74 below its threaded part 75, which passes through a hole 76 in diaphragm F and engages a dead ended threaded hole 77 in boss 70 of pressure plate 71 whereby diaphragm F is clamped between the collar 74 and plate 71. Stem 72 also extends down through the inlet 13 in the hub 14 leaving ample room for the fluid to pass around it. When the pressure of spring S is enough, through the stem 72 on valve disc D, disc D is forced away from its seat 15 and the fluid is allowed to pass from the inlet 17 through the plug passages 42 to lower diaphragm chamber 10 and thence, by way of passage 11, out through the larger outlet 12 into the outlet pipe 4.

To prevent the possibility of diaphragm F or collar 74 stopping up the passage 13, I prefer to provide the studs 9 which extend up into chamber 10 leaving passages 8 between.

Obviously the strainer can be omitted, if desired.

As shown in Fig. 6, screw 33 can be cut off level with the top of hole 32, and the valve sealed at a given pressure.

In Fig. 7 I show a modification in which the body M has at the top a diaphragm chamber 80 from which is an outlet 81 and a centrally disposed chamber inlet passage 82 which extends down into what might be considered a very shallow hub only sufficient to form the valve seat 83.

This valve seat 83 projects slightly downward into the top of valve chamber 84. 86 represents the main fluid inlet which enters chamber 84. Extending up into the bottom of chamber 84 is the tubular valve disc guide 87 which is shown as having the closed end 88 and as being forced or driven into a suitable opening 89 in the bottom of chamber 84. This valve guide extends up under and proximate valve seat 83 leaving plenty of room at the top for the liquid to pass in from inlet 86 through chamber 84 and inlet passage 82 thence to chamber 80 and through outlet 81 when the valve is not seated.

90 represents a valve disc of the same construction as in the other views and 91 is a disc seating spring between the disc and the end 88.

N represents a cage attached to the valve body and F is a diaphragm held between its rim and the body M of the valve.

The valve opening member P includes a pressure plate 71 as in the other construction and also a stem 94 one end of which rests on top of valve disc 90 and the other end of which 92 is threaded into the hole 77 in pressure plate 71.

It has a collar 93 and below this in the place of studs such as 9 attached to the casing, I use a star-shaped guard 95 which limits the movement of diaphragm F but does not obstruct the flow of fluid through inlet passage 82.

This guard 95 may be omitted if the diaphragm F is of suitable strength, or the stem 94 and other parts may be of such length that neither the diaphragm nor the collar 93 can obstruct passage 82.

96 represents the spring means for applying spring pressure to the top face of the diaphragm F.

The main pressure spring such as S or 96 must be strong enough to cause the valve stem to push the disc away from its seat when the valve is closed. This allows the passage of fluid from inlet 17 so that the water pressure bears against the whole large surface of diaphragm F thereby tending to compress the spring and allow the light valve disc closing spring to seat the valve. The force of the main spring as adjusted and of the water quickly balance each other without chattering whereby the water which comes through outlet 12 has the desired reduced pressure.

I claim:

1. The combination in a pressure reducing valve having a body on top of which is a diaphragm chamber with an outlet therefrom and a centrally disposed inlet passage thereto which extends down through a hub the end of which forms a valve seat, said body having a valve chamber which extends above said valve seat and into the side of which enters the main fluid inlet; a plug which extends up into the valve chamber thereby closing its end opposite the inlet passage, said plug having a centrally disposed dead ended tubular valve disc guide which is larger than the hub and has fluid inlets thereto from the valve chamber; a valve disc slidable in said valve disc guide and a disc seating spring between it and the end of the plug whereby the disc is normally held in contact with the hub valve seat; a cage attached to the valve body and having a spring housing and an adjusting screw hole; a diaphragm held at its rim between the cage and the body; an imperforate pressure plate positioned centrally on the top of the diaphragm and a stem positioned at the bottom and threaded through the diaphragm into said pressure plate, such stem extending loosely down through the inlet passage and engaging the valve disc; together with pressure means including an adjusting screw which passes through said hole in the top of the cage; and a pressure spring between this screw and the pressure plate.

2. The combination in a valve having a body on top of which is a chamber with an outlet therefrom and a centrally disposed inlet passage thereto which extends down through a hub the end of which forms a valve seat, said body having a valve chamber into the side of which enters the main fluid inlet, and at the bottom a threaded plug hole; of a plug screwed up into the plug hole, said plug having a part of such size and so extending up into the valve chamber as to leave a concentric space around it in the valve chamber, and having an axial tubular disc guide from which passages extend from around said seat to the valve chamber; a valve disc which includes an imperforate fibre disc seated in a recess in a metal cup slidable in said valve disc guide, a disc seating spring in the disc guide to normally press the disc against the valve seat; and a valve stem which extends down through the hub and engages the centre part of the fibre disc.

BURCHARD E. HORNE.